United States Patent Office 2,897,746
Patented Aug. 4, 1959

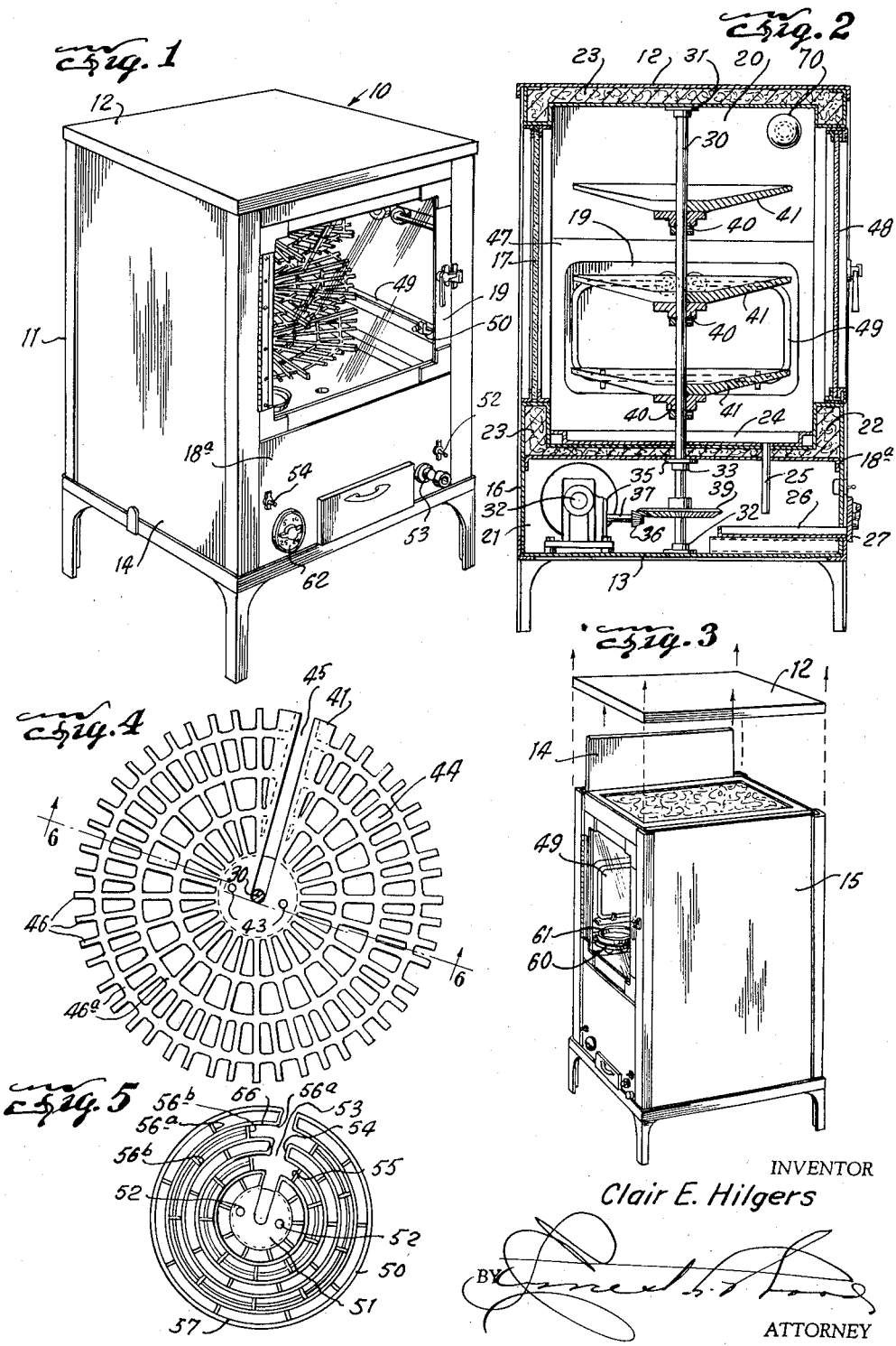

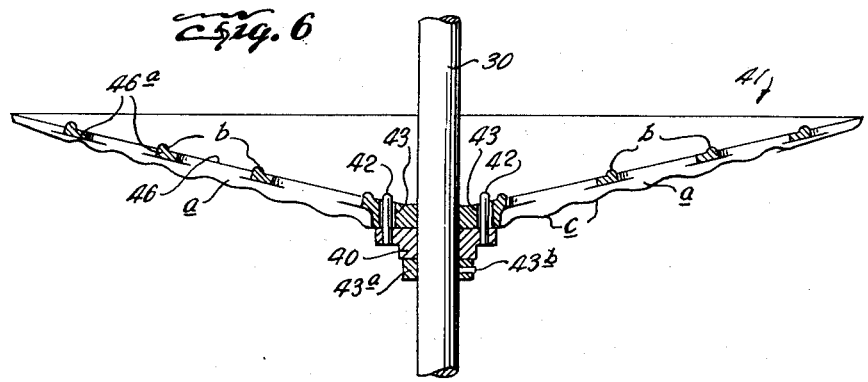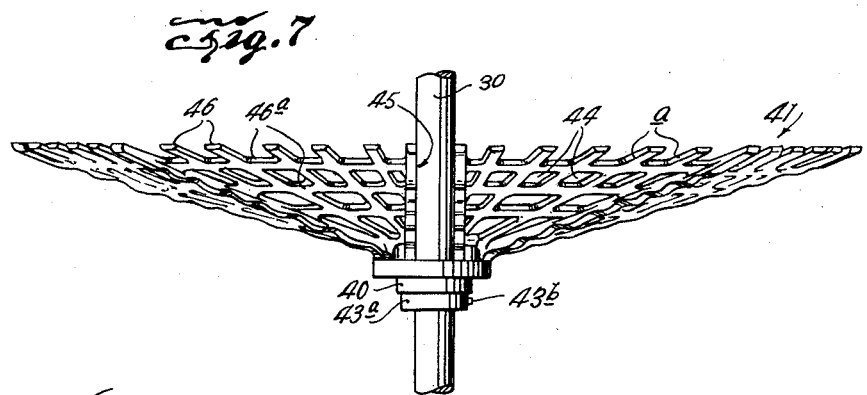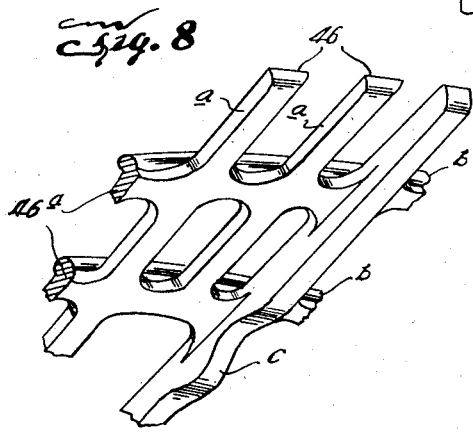
Clair E. Hilgers
INVENTOR
ATTORNEY

2,897,746

COMBINATION COOKER AND WARMER

Clair E. Hilgers, Dallas, Tex.

Application June 7, 1956, Serial No. 590,043

5 Claims. (Cl. 99—443)

This invention relates to broilers and more particularly to broilers of the type employing radiant heat to cook meats, poultry or other foods.

An object of this invention is to provide a new improved broiler which will cook the food in a minimum period of time in order to minimize shrinkage.

Another object of the invention is to provide a new and improved broiler having radiant and convective heating means and a means for moving food to be cooked past the radiant heating means.

A further object of the invention is to provide a new and improved broiler having a closed oven compartment through which a vertical rotatable shaft extends and which vertical shaft is provided with means for supporting food to be cooked in the oven compartment which includes a plurality of trays supported on the vertical shaft.

Another object of the invention is to provide a new and improved broiler wherein radiant heating means are disposed within the oven compartment adjacent the lower portion thereof to emit radiant heat rays toward food carried by the trays.

Still another object of the invention is to provide a new improved broiler which may be loaded in a staggered manner and unloaded in a similar manner, whereby some food may be placed in the broiler to commence cooking at one time and other food may be placed subsequently to commence cooking at a later time.

Still another object of the invention is to provide a new and improved broiler wherein the food may be removed at staggered intervals without unbalancing the machine or impairing its operation.

Broadly, the invention anticipates an improvement in food broiling apparatus over the conventional rotating spits by substituting therefor the vertical rotating shaft carrying the vertically spaced food trays whose reticulated and coniform design permit the radiant heat to reach and penetrate the food on the trays to the maximum. Moreover, the necessity for maintaining a balanced weight load as well as the necessity for piercing the meat or fowl, such as on a spit, is eliminated. The constant turning and flopping of the meat or fowl while being cooked on a spit results in a considerable loss of natural juices causing a material loss in weight due to shrinkage. In addition to the smooth and shock-free motion of the cooking trays, as compared with the erratic performance of the spit, due to frequent unbalanced impalement of food thereon, much time in loading and unloading of food is saved by virtue of radial slots in the food trays and the fact that the trays are supported on collars freely mounted on the shaft which permit the trays to be individually mounted on and removed from the shaft without interrupting its rotation, yet preventing accidental displacement of the trays on the shaft.

With the above named objects and others in view, the invention consists of a novel and useful provision, formation, construction, association and relative arrangement of parts, members and features, all as shown in certain embodiments in the accompanying drawings, described generally and more particularly pointed out in the claims.

In the drawings:

Fig. 1 is a perspective view of the new improved broiler;

Fig. 2 is a vertical sectional view of the broiler shown in Fig. 1;

Fig. 3 is a perspective view of the broiler shown in Figs. 1 and 2, with certain parts exploded to show features of the internal construction thereof;

Fig. 4 is a plane view of one of the trays of the broiler shown in Figs. 1, 2 and 3;

Fig. 5 is a top plane view of a modified form of the tray shown in Fig. 4.

Fig. 6 is a view of the tray on a larger scale, taken on line 6—6 of Fig. 4;

Fig. 7 is a side elevational view of a tray, and

Fig. 8 is a fragmentary perspective view of the underside of one of the food trays.

Referring now to the drawings, the broiler 10, includes a housing or cabinet 11, having a top 12, a bottom 13, a pair of side walls 14 and 15, a back side wall formed of a bottom panel 16 and a window 17. The front of the cabinet includes a panel 18a, and a glassed door 18.

The interior of the cabinet is separated into an upper oven compartment 20, and a lower engine or motor compartment 21, by a horizontal partition 22, disposed between the bottom panels 16 and 18a. The side walls and the horizontal partition 22 are doubled and provided with an internal filling insulating material 23, whereby the oven is well insulated against heat loss. A drain pan 24, is disposed in the oven compartment 20, and rests upon the horizontal partition 22. The drain pan 24 is provided with a drainpipe or trough 25, which extends downwardly through the horizontal partition 22, into the motor compartment 21, to empty the drippings into a drip pan 26, whose front end is provided with a door 27, located externally of the bottom front panel 18. The dripping pan extends through an opening in the front lower panel 18.

A vertical shaft 30 extends through the cabinet between the top 12, and the bottom 13, and its opposite ends are journaled in bearings 31 and 32. The vertical shaft extends through a suitable opening in the horizontal partition 22, which supports a collar 33, through which the vertical shaft 30, extends. The vertical shaft is rotated by an electrically driven motor 35, through a suitable speed reducing device 36, having a drive shaft 37, which is provided at its free end with a pinion gear 38, which meshes with a beveled gear 39, rigidly secured to the vertical shaft. The vertical shaft is provided within the oven compartment with three vertically spaced collars 40, on which rest the food supporting trays 41. Each of the collars 40, is provided with diametrically opposed upthrust pins 42, which are adapted to project and be received in correspondingly shaped apertures 43, in its corresponding tray 41, supporting each collar 40, for free rotation on the shaft is a set collar 43a which is secured to the shaft 30 by a set screw 43b. Each of the trays is of a conical shape with the circular walls thereof being inclined inwardly from their peripheral edges and downwardly toward the shaft 30. The conical shape of the trays serves a two-fold purpose. First, to permit heat rays from the heating element to reach the meat on the inner portion of the trays as well as that on the outside and second: to add strength to the tray itself. The trays are reticulated to provide a plurality of apertures 44, for a purpose to be described below.

To facilitate mounting of the trays on the vertical shaft 30, each of the trays is provided with a radial slot 45 whereby the tray may be readily mounted on its collar 40 by aligning the slot 45, with the shaft 30, and moving the tray inwardly into the cabinet until the shaft 30 is disposed in the center of the tray whereupon the tray is lowered until the pins 42, on the immediately adjacent collar 40, enter into the apertures 43, of the tray. The tray is thus supported on the collar 40, and is caused to rotate by frictional contact therewith and is held against tilting or lateral displacement on the shaft 30, by the pins 42.

In Figs 4, 6 and 7 it will be observed that the trays 41, each is formed by a plurality of radially extending ribs 46, and a plurality of arcuate or concentric ribs 46a, which intercross the ribs 46, thus forming the apertures 44, and providing a reticulated food support freely admitting rays of heat from the heating elements to be presently described. Thus, the food supported on the trays will receive heat equally on both sides, thoroughly cooking the same without necessity for turning the food on the trays while cooking. Certain of the radial ribs 46, have longitudinal serrated beads a, integrally formed on their underside to direct the drippings downwardly from the food on one tray onto the food on a subjacent tray to baste the same and the arcuate or concentric ribs 46a each has a longitudinally coextensive rib b formed integrally, with its upper surface to function as a dam to interrupt the downward course of the dripping and to feed the serrations c on the ribs a on which droplets of the drippings are formed.

Each of the sidewalls 14 and 15 have inner liners 47 of a metal having good reflective properties and are provided with drawn recesses 48 in which are mounted electrical heating units 49, which when energized by electric current emit radiant rays which cook the food supported on the trays. The drawn recesses 48 are designed and located in such a manner that an equal distribution of heat and a constant temperature is maintained throughout the interior of the machine. The heating units are supported by suitable brackets 50, and are connected to a source of electrical current through a switch 52 and a thermostat 53 which controls the energization of the heating units to maintain the desired temperature within the oven compartment 20. The motor 35, is controlled by a similar switch 54.

The wiring between the heating units and their controls and between the motor and its switch may be of any suitable well known type (not shown).

Also disposed within the heating compartment is a heating and igniting means 60, on which is supported a metal pan 61, to receive an aromatic wood, such as hickory, which when ignited fills the oven compartment with smoke to impart a desired flavor to the food within the compartment. The pan 61, is disposed outwardly of the peripheral edges of the trays to prevent dripping from food or basting sauce to fall into the pan. The igniting means 60, is connected with a suitable source of current through a timer switch 62, which permits the operator to preset the period of time during which smoke is desired within the oven compartment 20.

Access to the motor compartment 21, may be had through the side wall 14, which is slidable upwardly when the top 12 is removed to open either side of the motor compartment.

In use, the operator loads food to be cooked on the trays 41. The trays, if desired, may be loaded while in the machine. In either case, no care need be exercised to insure a balanced weight load, as is necessary in loading a spit barbecue machine, hence much time is saved in loading. The tray, if loaded outside the machine, is then placed on the shaft 30, while the door 19 is open in the manner described above. Since the shaft is in a vertical position as much or as little food may be placed upon the trays or a single tray as is desired. If it is anticipated that the demand for the cooked food will be staggered throughout a certain period of time only a certain amount of food is initially placed upon the trays. At desired intervals of time, additional food may be placed upon the trays with no impairment of operation of the broiler. When the trays are properly loaded the door 19 is closed, the thermostat 53 is set at the desired temperature and the switch 52 is closed to energize the heating elements or units 49. At the same time the switch 54 is closed to energize the motor 35 and cause the vertical shaft 30 to rotate, thus placing the food on the trays between the heating units 49 to expose them uniformly to the radiant heat emitted by the heating units. The heat emitted by the heating units 49, also cause it to warm the air within the oven compartment 20, which causes convection currents to be set within the oven compartment 20, as the heating units are located in the lower part of the oven compartment and the sides thereof. As a result the food on the trays is cooked both by radiant and by convection heat. At the same time a more uniform temperature both at the lower and upper portions of the oven compartment is obtained. The provision of convective heating as well as radiant heating imparts a natural brown color to the food held on the trays, 41.

It will be apparent that the heat rays from the radiant heating units 49, travel upwardly through the apertures 44, of the trays to impinge upon the food. It will also be apparent that the reflective metal forming the inner walls bottom and top of the open compartment reflects the heat rays toward the food supported on the trays.

At a desired moment or phase of the cooking process the timer switch 62 is actuated to cause the heating unit 60, to be energized and ignite the wood which is placed in the pan 61. Inasmuch as the oven compartment is airtight the wood does not burst into flame but merely smolders to provide aromatic smoke within the oven compartment.

When the food has been cooked to the desired degree the operator merely opens the door 19, and removes such portions of the food as are desired at the moment. Removal of certain portions of the food does not in any way affect the operation of the oven since the removal thereof does not in any way unbalance the machine. As the day progresses and some of the food is utilized, new uncooked food can be placed upon the trays while the trays still carry other cooked portions of the food. In this manner both staggered loading and staggered unloading is made possible by the use of the vertical shaft 30, and the trays, 41.

When it is desired to clean the machine the trays are first lifted to free the pins 42, from the apertures 43, and then moved laterally outwardly through the door 19, the slots 45 in the trays permitting this movement of the trays from the shaft 30. The trays 36 can then be taken to a wash basin for easy cleaning. At the same time, the interior of the oven compartment is now free of the trays rendering all portions thereof accessible for easy cleaning thereof.

The oven compartment may be provided with a light bulb 70 to illuminate the interior of the oven compartment. A suitable switch may be provided to control the operation of the light bulb 70, or it may be connected to be controlled by either the switch 52, or the switch 54.

It will be seen now that a new and improved broiler has been described and illustrated which permits staggered cooking or staggered loading and unloading of the machine by the use of a vertical shaft on which are removably positioned trays 41.

It will now be apparent that the new improved broiler which has been described and illustrated presents marked advantages over the conventional broiler which usually includes a plurality of spits disposed about a horizontal rotatable shaft. In such conventional broilers the food to be cooked is placed on the spits and the food must be evenly arranged or balanced as to weight about the rotatable shaft. This arrangement requires that all of the food be placed upon the spits at the same time and removed at the same time, since otherwise the broiler is unbalanced as regards the rotatable shaft and definite jerks or shocks are imparted to the remaining food once some of the food is removed from one of the spits. Moreover, the operation of loading and unloading the spits becomes a skilled operation since close balancing of the food on the rotatable shaft is necessary. The broiler of the invention obviously permits food to be placed and removed from the trays on the vertical shaft at any time, thus permitting staggered loading and unloading of the food and staggered cooking of the food.

Referring now particularly to Fig. 5, the modified form of the tray 50, includes a central supporting plate 51, provided with apertures 52, for receiving the pins 42, of the supporting collars 40, on the vertical shaft 30. The central plate also is provided with a radial slot 53, to receive the vertical shaft 30. Extending radially outwardly and upwardly are a plurality of radial supports 54, which have laterally offset portions 55, so that any fluids which may be deposited on the outer upper sections or portions of the radial support members will not flow downwardly towards the central plate 51, and thence downwardly on the shaft 30, but will drip off the horizontal sections 56, of the radial supports onto food which may be disposed on other trays 50, disposed therebelow on the shaft 30. The horizontal sections 56, may be inclined toward the corners 56a and 56b to assure this dripping action. Horizontal support members 57 extend in almost complete circles about the central plate 51, and are progressively spaced therefrom and are connected to the radial members 54, thus forming a strong tray which, however, prevents flow of basting sauces or cooking juices from the food on one tray down to the shaft and thence down to the drain pan. It is preferable that such juices fall or drip on the food disposed on the next tray therebeneath.

Manifestly, the construction as shown and described is capable of some modification and such modification as may be construed to fall within the scope and meaning of the appended claims is also considered to be within the spirit and intent of the invention.

What is claimed is:

1. A broiler comprising: A cabinet having an upper oven compartment, a door providing access to the interior of the oven compartment, a lower compartment disposed below said oven compartment, a vertical shaft extending from the lower compartment upwardly into the oven compartment, means in the lower compartment for rotating said vertical shaft, and a plurality of shallow coniform trays supported on said vertical shaft and removable laterally from said shaft through said door; a drain pan disposed between the lower compartment and the oven compartment to receive drippings from food cooked on said trays, and a removable drip pan disposed in the lower compartment for receiving fluids from the drain pan, said drain pan having a drain pipe extending into the lower compartment.

2. A broiler comprising: A cabinet having an upper oven compartment, a door providing access to the interior of the oven compartment, a lower compartment disposed below said oven compartment, a vertical shaft extending from the lower compartment upwardly into the oven compartment, means in the lower compartment for rotating said vertical shaft, and a plurality of reticulated coniform trays supported on said vertical shaft and removable laterally from said shaft through said door; a drain pan disposed between the lower compartment and the oven compartment to receive drippings from food cooked on said trays, and a removable drip pan disposed in the lower compartment for receiving fluids from the drain pan, said drain pan having a drain pipe extending into the lower compartment and means in said oven compartment disposed in one corner thereof and outwardly of the peripheral edges of the food carrying trays for supporting and igniting an aromatic smoke producing substance.

3. A tray for broilers comprising a central plate, a plurality of radial support members extending upwardly and outwardly from the central plate, each having a longitudinal bead on its underside, and a plurality of arcuate members outwardly and upwardly spaced from the central plate and secured to said radial members, and arcuate members each having a longitudinally continuous bead on its upper surface.

4. A tray for broilers comprising a central plate, having a radial slot extending from said central plate to the periphery of said tray, a plurality of radial support members extending upwardly and outwardly from the central plate, a bead integral with and extending longitudinally on the underside of each of said radial support members and a plurality of arcuate members outwardly and upwardly spaced from the central plate and secured to said radial members and means integral and with said arcuate members for interrupting the downward course of food drippings on said tray.

5. In apparatus for broiling meats, the combination of a cabinet having a cooking chamber and an engine compartment below the cooking chamber, a door in one side of the cabinet communicating with the cooking chamber, a vertically disposed rotatable shaft arranged centrally of the cabinet, the shaft extending from the top of the cabinet to the bottom hereof and traversing the cooking chamber and the engine compartment, means in the engine compartment for rotating the shaft, a source of radiant heat in the lower portion of the cooking chamber, adjacent an inner wall thereof, arranged to project radiant heat toward the center of the chamber, and a plurality of substantially conical, reticulated food trays surrounding the shaft and spaced longitudinally relative thereto, the trays being frusto-conical and having a circular, horizontally disposed central portion and an upwardly and radially outwardly inclined portion surrounding the central portion, and means adjustably and removably connecting the trays to the shaft comprising a slot in each of the trays partially encircling the shaft and extending the shaft and extending radially outwardly therefrom whereby the trays may be readily applied to and withdrawn from the shaft from one side thereof, through the door of the cabinet, a plurality of collars each surrounding the shaft and supporting one of the trays, the collars each having a pair of diametrically opposed pins rigidly secured thereto and extending upwardly therefrom, the trays each having openings in its central portion for engagement with the upstanding pins of one of the collars, and a plurality of collars each surrounding the shaft and supporting one of the first mentioned collars, the last mentioned collars each having a set screw therein whereby it is adjustably secured to the shaft.

References Cited in the file of this patent

UNITED STATES PATENTS

| | | |
|---|---|---|
| 736,301 | Sanford | Aug. 11, 1903 |
| 1,312,833 | Colias | Aug. 12, 1919 |
| 1,351,394 | Martin | Aug. 31, 1920 |
| 1,535,579 | Colby | Apr. 28, 1925 |
| 1,660,200 | Kummermehr et al. | Feb. 21, 1928 |
| 2,438,699 | Groetchen | Mar. 30, 1948 |
| 2,629,314 | Varady | Feb. 24, 1953 |

FOREIGN PATENTS

| | | |
|---|---|---|
| 160,828 | France | Mar. 10, 1884 |
| 1,103,130 | France | May 18, 1955 |